United States Patent

Schabbel

[15] 3,673,700

[45] July 4, 1972

[54] COFFEE ROASTING PLANT WITH AUTOMATIC SAMPLING ARRANGEMENT

[72] Inventor: Roland Schabbel, Emmerich-Huthum, Germany

[73] Assignee: Probat-Werke von Gimborn & Co. K.G., Emmerich, Germany

[22] Filed: Aug. 19, 1970

[21] Appl. No.: 64,963

[30] Foreign Application Priority Data

Sept. 11, 1969 Germany .....................P 19 46 132.6

[52] U.S. Cl. ...................................34/89, 73/423, 302/49
[51] Int. Cl. ........................................................A23n 9/00
[58] Field of Search................34/89, 102; 99/236 C; 73/421, 73/421 A, 421 B, 422, 422 TC, 423, 424, 423 A; 302/49

[56] References Cited

UNITED STATES PATENTS

| 661,568 | 11/1900 | Walter | 34/92 X |
| 2,665,409 | 1/1954 | Rogers | 73/422 X |
| 1,550,037 | 8/1925 | McGarvey | 302/51 X |
| 1,966,712 | 7/1934 | Fisher et al. | 73/422 TC |

*Primary Examiner*—Frederick L. Matteson
*Assistant Examiner*—Harry B. Ramey
*Attorney*—Kelman and Berman

[57] ABSTRACT

The several roasting ovens of a coffee roasting plant are equipped with mechanical samplers connected by pneumatic conveyors to a common testing station. Electronic controls operate the samplers in timed sequence to withdraw samples for testing which are thereafter returned automatically to the same oven by a distributor at the testing station and pneumatic conveyors, the distributor being operated by the electronic controls. Withdrawal of samples may be automatic or semi-automatic. Special design of samplers prevents mixing of material sequentially withdrawn from the same oven.

8 Claims, 4 Drawing Figures

COFFEE ROASTING PLANT WITH AUTOMATIC SAMPLING ARRANGEMENT

This invention relates to the roasting of coffee, normally in the form of green beans, and particularly to a coffee roasting plant equipped with an automatic sampling arrangement.

For optimum flavor of the product, the roasting of coffee must be closely controlled as to temperature and time, the color change in the roasting material being the most significant indicator of its condition. It is necessary, therefore, to withdraw samples from the roasting oven from time to time and to inspect them at least for their color. Because of the rapidity with which changes in the material take place, particularly during the critical final phase of the roasting process, samples must be withdrawn at short intervals.

It is an object of the invention to provide a coffee roasting plant with automatic or semi-automatic sampling and testing equipment which permits a large number of samples to be withdrawn in quick sequence, and to be returned to the roasting oven after testing before the bulk of the coffee in the oven differs significantly from the returned samples.

Another object is the provision of sampling equipment which feeds samples from several ovens to the same testing station and returns the tested samples to the ovens from which they originated.

A coffee roasting plant of the invention thus may include roasting equipment for the green coffee, sampling equipment for withdrawing a sample of the coffee being roasted, and a testing station remote from the roasting equipment proper and connected to the roasting equipment by two conveyor systems. A sample withdrawn from the roasting equipment and conveyed to the testing station is held there for a period sufficient to permit the testing thereof and is thereafter returned to the roasting equipment. The operation of the sampling equipment is controlled from the testing station.

Where more than one roasting oven is employed in the same plant of the invention, each oven is equipped with an associated sampling device, and the several sampling devices are connected with the same testing station by respective pairs of conveying devices, and a distributor may be interposed between the testing station and the return conveyors for returning each sample to its original oven.

Other features, additional objects, and many of the attendant advantages of this invention will readily be appreciated as the same becomes better understood by reference to the following detailed description of a preferred embodiment when considered in connection with the appended drawing in which.

Figure 1:
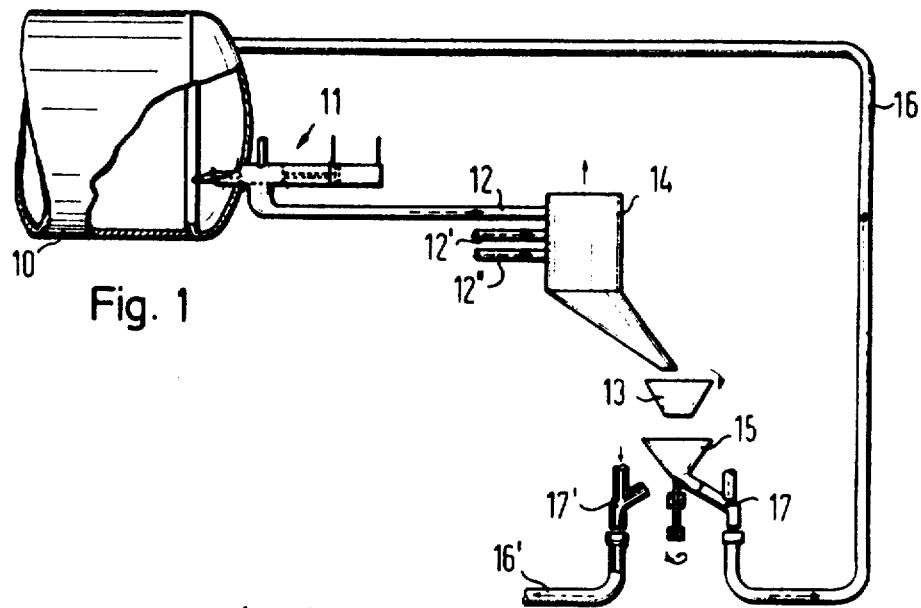
FIG. 1 shows a roasting plant of the invention in partly sectional, fragmentary elevation.

Referring now to the drawing in detail, and initially to FIG. 1, there is shown only as much of an otherwise conventional coffee roasting plant as is needed for an understanding of the invention. The plant includes three identical and identically equipped roasting ovens 10 of which only one is partly visible in FIG. 1. The oven, conventional in itself, has a cylindrical casing which is being rotated about its horizontal axis while its contents are being heated. It is axially closed by stationary, dished covers.

A mechanical sampler 11 extends into the oven cavity through one of the stationary covers and is connected by a pneumatic conveyor conduit 12 to an air separator 14. As will presently be described in greater detail, a coffee sample withdrawn from the oven 10 by the sampler 11 is pneumatically conveyed through the conduit 12 to the separator 14 from which the air is released upwardly to the atmosphere whereas the roasted product is dropped by gravity into a holding device 13, an open container in which the sample may be tested, as by visual inspection.

When released from the holding device 13 after the testing period, the sample is dropped into a funnel-shaped receptacle 15 capable of being rotated about its vertical axis. The obliquely inclined discharge chute of the receptacle 15 leads into the Y-shaped inlet fitting 17 of another pneumatic conveyor conduit 16 which returns the tested sample to the oven 10.

The two non-illustrated roasting ovens are equipped with samplers identical with the sampler 11 and connected with the air separator 14 by respective conveyor conduits 12', 12". When the receptacle 15 is turned about its axis, its discharge chute acts as a distributor which may lead the contents of the receptacle to the inlet fitting 17' of a conveyor conduit 16' leading back to one of the non-illustrated ovens, and to non-illustrated analogous elements associated with the third oven, the three intake fittings being arranged equiangularly on a circle about the axis of rotation of the receptacle 15.

As will be described in greater detail with reference to FIG. 4, controls at the testing station cause samples to be withdrawn sequentially from the three ovens, conveyed to the holding device 13 for separate and sequential testing, and then returned to the oven of origin through the receptacle 15 and the several return conveyor conduits.

Figure 2:
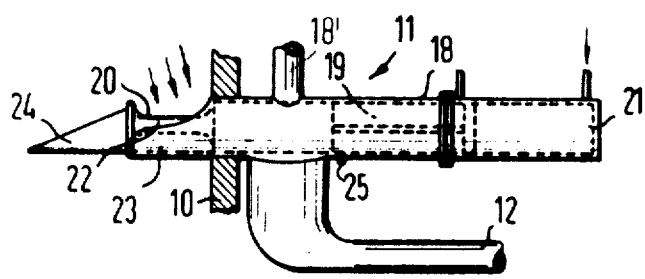
FIG. 2 shows a mechanical sampler of the plant in a view corresponding to that of FIG. 1, but on a larger scale.
Figure 3:
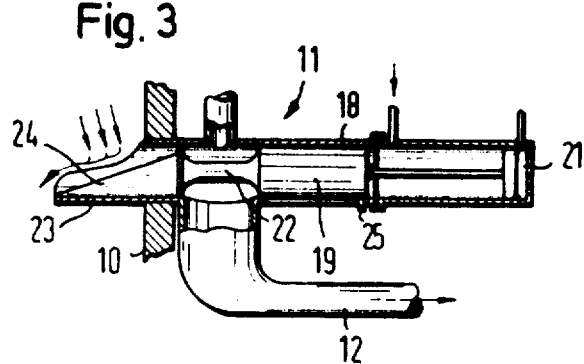
FIG. 3 illustrates the device of FIG. 2 in a different operating position.

A mechanical sampler 11 of the invention and associated elements are shown in FIG. 2 in the charging position and in FIG. 3 in the discharging position. The sample has a cylindrical tubular shell 18 fixedly attached to the stationary upright wall of the oven 10. A plunger 19 slides axially in the shell 18 when hydraulic fluid is admitted to a double-acting hydraulic cylinder 21 coaxially flanged to the portion of the shell 18 remote from the oven. An annular circumferential groove 20 in the axially central portion 22 of the plunger reduces the cross section of the latter to a small fraction of the cross section of the shell 18.

An axial end portion 23 of the shell 18 extends into the cavity of the oven 10 and is cut obliquely to its axis in such a manner as to support and guide the front end 24 of the plunger 19 during its axial movement in the shell 18 while leaving the plunger upwardly exposed in the oven cavity to particles of roasting coffee which are lifted by the rotating oven casing and then drop by gravity as indicated by multiple arrows in FIGS. 2 and 3. The front end 24 of the plunger tapers inward of the oven in an approximate wedge shape so as to deflect impinging coffee particles toward the oven cavity.

A radial nipple 18' projects upward from the shell 18 adjacent the outer wall of the oven 10 and is connected by an air line to a compressor in a manner conventional in itself and not illustrated. The intake orifice of the conveyor conduit 12 is enlarged to a diameter approximately equal to the axial length of the groove 20 and connected with the shell 18 in diametrical alignment with the nipple 18'. An axial slot in the shell 18 receives a short radial pin 25 on the plunger 19, thereby preventing rotation of the plunger about its axis and maintaining the angular orientation of the wedge-shaped plunger portion 24.

In the charging position of the sampler (FIG. 2), the cylindrical rear portion of the plunger 19 practically seals the air nipple 18' and the conveyor conduit 12 from each other and from the oven cavity. The reduced central plunger portion 22 is exposed in the guide portion 23 of the shell 18 to the descending coffee particles which quickly fill the chamber in the groove 20 partly bounded by the shell portion 23. When the plunger is retracted to the discharging position, the groove 22 connects the nipple 18' to the conveyor conduit 12, and the sample withdrawn in the chamber of the groove is blown out of the plunger and through the conduit 12 into the air separator 14 at the testing station. When the plunger returns to the charging position at the beginning of the next operating cycle, any coffee beans caught in the guide portion 23 of the shell 18 are swept out so that the next sample withdrawn is taken entirely from the particles freely moving in the oven and representative of the general condition of the roasting material.

Figure 4:
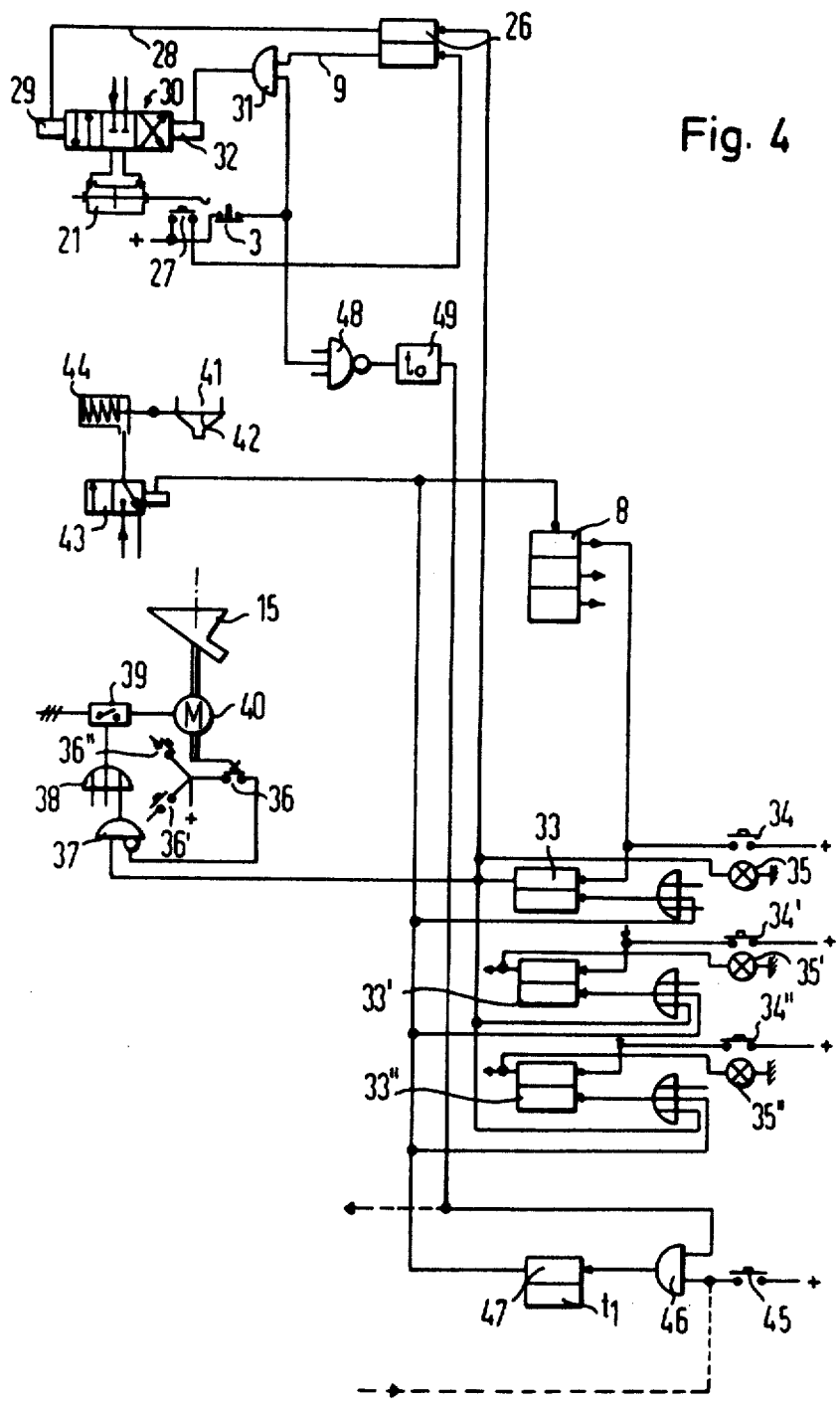
FIG. 4 is a schematic of the electrical controls in the roasting plant of FIG. 1, and also shows associated mechanical elements.

Preferred electric and hydraulic circuits for semi-automatically or automatically controlling the operation of the sampling and testing equipment shown in FIG. 1 is illustrated in FIG. 4 mainly by conventional symbols. With certain exceptions, which will become apparent as the description proceeds, only control elements associated with one oven 10 have been represented in FIG. 4, and will be understood to be duplicated as needed.

A binary storage element 26 is associated with each sampler 11, and its resetting or clearing input is fed by a normally open limit switch 27 operated by the plunger 19 in the charging position of the latter. Its output conductor 28 supplies energizing current to an electromagnet 29 when the element 26 is set. The electromagnet 29 is one of the two magnetic actuating devices of a control valve 30 in the hydraulic circuit of the cylinder 21, and causes the sampler 11 to be shifted to the charging position when energized.

When the element 26 is cleared, its output 9 is conductive and is connected with one of the inputs of an AND gate 31. The second input of the gate 31 is fed by way of a normally closed limit switch 3 which is operated by the plunger 19 in the discharging position of the latter. When in the conductive condition, the output of the AND gate 31 energizes the other actuating electromagnet 32 of the control valve 30, and thereby causes the sampler 11 to be shifted to the discharging position.

The circuitry described so far permits samples to be withdrawn from the oven 10 in a fully automatic manner after the storage element 26 has received a setting pulse. First, the actuating electromagnet 29 is energized by the output 28, and the plunger 19 is shifted into the charging position. When that position is reached, the switch 27 is closed, and the storage element 26 is cleared. The output 28 assumes its non-conductive condition while the output 9 becomes conductive. Accordingly, the actuating electromagnet 32 is energized by the AND gate 31, and the plunger is retracted toward the discharging position. When that position is reached, the switch 3 is opened, and the magnet 32 is energized.

The samples withdrawn in the manner described above are returned to the oven from which they were initially taken. Three storage elements 33, 33', 33'' are respectively associated with the three ovens for coordinated control of the sampling devices and of the distributor mechanism mainly represented by the receptacle 15. The storage devices 33, 33', 33'' are set manually at the testing station by means of normally open, respective push-button switches 34, 34', 34''. Pilot lights 35, 35', 35'' on the control board of the testing station are respectively arranged in the output circuits of the last-mentioned storage devices which are conductive in the set condition of the devices to indicate from which oven a sample is being drawn.

The distributor mechanism includes a comparator circuit which responds to the presence of a setting signal, that is, to the set condition of one of the elements 33, 33', 33'', to interrupt transmission of the setting signal as soon as the distributor mechanism assumes a position corresponding to the signal. When the distributor mechanism rotates, normally open switches 36, 36', 36'' are sequentially closed and thereby indicate the position of the mechanism. When the switch 36 is closed, the output of a connected gate 37 is non-conductive. The gate 37 and corresponding, non-illustrated gates associated with the other ovens operate an OR gate 38 so as to close the magnetic switch 39 of the drive motor 40 which turns the distributor mechanism about its vertical axis. When the desired position of the receptacle 15 is reached, the motor 40 is stopped.

The holding device 13, briefly referred to with reference to FIG. 1, mainly consists of a pan 41 having a sliding bottom 42. A control valve 43 actuated electromagnetically substantially as described with reference to valve 30 can admit hydraulic fluid to a single-acting cylinder 44 to withdraw the bottom 42 and thereby to drop the contents of the pan into the receptacle 15. The bottom 42 is normally held in its closed position by a return spring in the cylinder 44. The actuator of the valve 43 may be energized after visual inspection of a sample by manually closing a push-button switch 45 in one input circuit of an AND gate 46, a monostable multi-vibrator 47 being arranged in the output circuit of the last-mentioned gate.

The valve 43 can be operated only after a period to ensure that the sample has been entirely swept through the relatively long conduit 12 into the pan 41 and cannot contaminate a subsequent sample. For this purpose, the second input circuit of the AND gate 46 is provided with a gate 48 in series circuit with a time delay element 49 which keeps the gate 46 blocked for a suitable period after the plunger 19 was retracted to the discharging position. The multivibrator 47 reverts to its stable state after a time $t_1$ selected to ensure complete emptying of the pan 41 before the bottom 42 reverts to its closed position.

The arrangement described so far calls for visual inspection of the withdrawn sample while it is being held in the pan 41, but it will be appreciated that the operator's eye may be replaced or supplemented by a photoelectric cell arrangement which receives light reflected from the sample in the pan 41, and is connected with a recorder in which the color change of the three batches of beans in the ovens 10 is converted to three curves on a moving chart by intermittent multipoint recording. Each cycle in the operation of the photoelectric recording equipment may be triggered by the output signal of the time delay element 49, as indicated by a broken line and arrow, and operation of the push-button 45 after completion of the test is unnecessary if the corresponding input of the gate 46 is connected to the recorder as indicated by another broken line to receive a pulse whenever a test is completed and a dot is recorded on the chart.

In order to prevent withdrawal of a sample from an oven before a previously tested sample has been returned to another oven, the storage elements 33, 33', 33'' are interlocked, the output of each element which is conductive in the set condition of the element being fed back to the clearing inputs of the two other elements.

The apparatus described so far is readily modified for fully automatic sample withrawal. For this purpose, a ring counter 8 is arranged to receive an input pulse whenever the valve 43 is actuated, the three outputs of the counter being connected to the inputs of the storage elements 33, 33', 33'' respectively to assume or supplement the functions of the push-button switches 34, 34', 34''. If manual operation is not contemplated, and these switches are removed, it is not necessary to interlock the storage elements 33, 33', 33''.

While the apparatus illustrated and described has been found effective and is preferred at this time, it is obviously capable of many modifications without departing from the spirit and scope of this invention.

Thus, the sliding plunger 19 and associated elements of the mechanical sampler 11 may be replaced by a pivotally mounted cup of V-shaped cross section in a plane perpendicular to the pivot axis, and tilted into the oven 10 in its charging position. The cup is arranged so that it discharges its contents into the conduit 12 when tilted into the discharging position. The cylinder 21 is readily modified to pivot the cup. Alternatively, the sampler may be provided with a rotary slide valve whose bore or chamber communicates with the oven cavity in its charging position for receiving the sample, and which reaches a discharging position after a 180° turn to release the sample to the conduit 12. The valve may be turned by an electrically controlled hydraulic actuator not significantly different from the cylinder 21 through a suitable linkage. Ultimately, a portion of the roasting material may be passed in a stream through a duct or channel within the oven 10, and a sample may be withdrawn from the stream by means of compressed air or suction.

Similarly, modifications will readily be arrived at in the electronic circuitry. Thus the AND gate 31 and the normally closed limit switch 32 may be replaced by an OR-NOT gate having one input terminal connected to the output line 28 of the storage element 26, and associated with a normally open limit switch.

Obviously, other modifications and variations of the present invention are possible in the light of the above teachings. It is therefore to be understood that, within the scope of the appended claims, the invention may be practiced otherwise than as specifically described.

What is claimed is:

1. A coffee roasting plant comprising, in combination:
   a. roasting means for roasting green coffee, said roasting means including a container adapted to contain said coffee during said roasting thereof;
   b. sampling means for withdrawing a sample of the coffee being roasted in said roasting means, said sampling means including
      1. a tubular shell having an axis, and
      2. a slide movable axially in said shell between a charging position and a discharging position,
      3. said slide being formed with a chamber communicating with said container in said charging position for receiving a sample to be withdrawn;
   c. a testing station remote from said roasting means;
   d. first conveying means communicating with said chamber in said discharging position of said slide for conveying the sample withdrawn from said roasting means to said testing station, said testing station including
      1. holding means for holding the conveyed sample for a period sufficient to permit testing of the sample, and
      2. control means for controlling the operation of said sampling means by moving said slide between said positions thereof;
   e. second conveying means for returning the tested sample from said holding means to said roasting means; and
   f. means for passing a stream of air through said chamber toward said first conveying means in said discharging position of said slide.

2. A coffee roasting plant comprising, in combination:
   a. roasting means for roasting green coffee, said roasting means including a container adapted to contain said coffee during said roasting thereof;
   b. sampling means for withdrawing a sample of the coffee being roasted in said roasting means, said sampling means including
      1. a tubular shell having an axis, and
      2. a slide movable axially in said shell between a charging position and a discharging position,
      3. said slide being formed with a chamber communicating with said container in said charging position for receiving a sample to be withdrawn;
   c. a testing station remote from said roasting means;
   d. first conveying means communicating with said chamber in said discharging position of said slide for conveying the sample withdrawn from said roasting means to said testing station, said testing station including
      1. holding means for holding the conveyed sample for a period sufficient to permit testing of the sample, and
      2. control means for controlling the operation of said sampling means by moving said slide between said positions thereof;
   e. second conveying means for returning the tested sample from said holding means to said roasting means;
   f. sweeping means on said slide,
      1. said container having a wall, said slide projecting from said wall inward of said container in said charging position; and
   g. guide means on said wall in said container for guiding said slide toward and away from said charging position,
      1. said sweeping means sweeping coffee from said guide means when said slide moves from said discharging toward said charging position thereof.

3. A plant as set forth in claim 2, wherein said conveying means each include an elongated conduit extending between said testing station and said roasting means, and means for generating a longitudinal stream of air in said conduit.

4. A plant as set forth in claim 2, wherein said holding means include an open container adapted to receive said conveyed sample, and discharge means for discharging the tested sample after said period.

5. A coffee roasting plant comprising, in combination:
   a. roasting means for roasting green coffee and including a plurality of roasting ovens;
   b. a plurality of sampling means respectively associated with said ovens for withdrawing samples of the coffee being roasted from the associated roasting ovens;
   c. a testing station remote from said roasting means;
   d. a plurality of first conveying means respectively connecting said sampling means to said testing station for conveying the samples withdrawn from said roasting means to said testing station, said testing station including
      1. holding means including an open container adapted to receive each conveyed sample and to hold the same for a period sufficient to permit the testing of said sample,
      2. discharge means for discharging the tested sample after said period, and
      3. control means for controlling the operation of said sampling means;
   e. a plurality of second conveying means respectively connecting said testing station to said roasting ovens for returning the tested samples to said roasting means; and
   f. connecting means for connecting said holding means with each of said first and second conveying means.

6. A plant as set forth in claim 5, wherein said connecting means include distributor means for alternatively connecting said holding means with said second conveying means.

7. A plant as set forth in claim 6, wherein said control means include first operating means for sequentially operating said sampling means for thereby causing respective samples to be conveyed sequentially to said testing station by said first conveying means, and second operating means operating said distributor means for returning each sample from said testing station to the roasting oven from which it was withdrawn through the corresponding second conveying means.

8. A plant as set forth in claim 7, wherein said control means further include electrically operated means for actuating said first and second operating means in timed sequence.

* * * * *